3,121,640
ALUMINA REFRACTORIES
Eldon D. Miller, Jr., Bridgeville, Pa., assignor to Harbison-Walker Refractories Company, Pittsburgh, Pa., a corporation of Pennsylvania
No Drawing. Filed Oct. 30, 1962, Ser. No. 234,220
11 Claims. (Cl. 106—68)

This invention relates to refractories of high alumina content, by which is meant, for the purposes of this invention, refractories containing at least about 50% of $Al_2O_3$ by analysis. More particularly, it relates to improved high alumina refractory casting compositions. This application is a continuation-in-part of my co-pending application S.N. 847,865 for "Alumina Refractories," now U.S. Patent No. 3,067,050.

In my co-pending application, above identified, it is explained that high alumina refractories are generally classified by their $Al_2O_3$ content into groups having, approximately, 50, 60, 70, 80, 90, of 99% $Al_2O_3$ by oxide analysis. Those containing 50 to 90% of $Al_2O_3$ are made by blending various high alumina refractory materials, while those of 99% content are made from high purity alumina. The more common high alumina refractory materials and their typical $Al_2O_3$ contents are discussed and set forth in detail in my co-pending application. All of these materials, are chemically compatible and accordingly they are commonly blended to provide almost any desired resulting $Al_2O_3$ content.

Refractory brick and shapes of such compositions are usually made by the power press, impact press, and extrusion processes, and particularly with more complex shapes, by various methods of casting. In the power press and impact press processes the raw materials are ground, screened to the desired sizes, blended and thoroughly mixed with a small but controlled amount of a tempering fluid such as water. The moistened batch is then fed to a press in which the brick are formed under high pressure following which they are dried and then fired to develop the desired properties.

In the extrusion process, the batch, tempered with water, is extruded through a die in the form of a dense column which is cut by wires into brick shapes which are then repressed to give them sharp corners and edges. Batches of the foregoing type are also shaped by ramming or gunning under pressure.

Exemplary casting techniques or methods include vibration casting of a rather heavy but flowable mixture into either a moisture absorbent or non-moisture absorbent mold, slip casting a thin mixture into a moisture absorbent mold, etc. This invention relates particularly to casting compositions or mixtures particularly suitable for vibration casting into a moisture absorbent mold.

While the compositions particularly described in my co-pending application are suitable for various casting techniques some difficulties have been encountered when attempting to vibration cast them. It appears that the spherical character of the very finely divided volatilized silica which is included in the batches promotes undesirably rigid characteristics in green shapes in molds. Because of this green rigidity, after the material has been poured into such as a plaster mold, and concommitant with its shrinkage during setting, surface cracking of the shape is quite frequent. This cracking is particularly prevalent about internal mold pieces such as those used to form intricate internal cavities in a refractory shape.

Accordingly, it is among the objects of this invention to provide improved high alumina refractory compositions particularly suited for fabrication of shapes according to known casting techniques. It is another object of this invention to provide high alumina refractory compositions which, as compared to those previously known, provide high alumina refractory shapes which are of increased strength, increased abrasion resistance, higher density, lower porosity, lower permeability, higher refractoriness, which are made from commercially available raw materials, and which are particularly suited for fabrication of shapes by known casting techniques.

This invention is predicated upon my discovery that cast high alumina refractory shapes, having the improved characteristics noted for the compositions of my co-pending application are made particularly suitable for casting techniques by the addition of from 1 to not over 5 percent of a particular type of selected clay to a batch of the desired alumina content. The major portion of the discrete particles of the selected particular clay are very finely divided and are mineralogically characterized as plate-like or laminar.

In the typical practice of this invention batches are prepared in the following manner:

A high alumina refractory mixture of a desired $Al_2O_3$ content is prepared according to the teachings of my co-pending application. From 1 to not over 10 percent by weight based on the total weight of the dry batch of volatilized silica is added. From 1 to not over 5 percent of a selected particular clay (all —325 mesh) is added to the foregoing mixture of volatilized silica and alumina material. Since the particles of selected particular clay and volatilized silica are extremely fine (ideally submicron in size), the alumina material is so size graded as to provide the desired graded size range in the batch. A preferred screen sizing for a batch is as follows:

Passing a 4 mesh and resting on a 10 mesh screen, about 30%;
Passing a 10 mesh and resting on a 28 mesh screen, about 20%;
Passing a 28 mesh and resting on a 65 mesh screen, about 10%;
The rest passing a 65 mesh screen (about 40%).

It is preferable that a mjor portion of the —65 mesh fraction of the mix passes a 325 mesh screen. Optimum results are obtained when over 70 percent of the —65 mesh fraction passes a 325 mesh screen.

About 5.5 to 7.5 percent of a tempering fluid and from 0.1 to 0.3 percent of a dispersant, both based on the total weight of the dry batch, are added to the dry batch. Any of a wide variety of known tempering fluids and dispersants may be used. However, I suggest water as the tempering fluid and a sodium phosphate as the dispersant. A suitable sodium phosphate is such as the commercially available material sold under the trade name "Calgon."

The wet batch ingredients are intimately admixed to provide a flowable mixture. The flowable mixture is cast into a moisture-absorbent plaster mold with concomitant vibration. The cast mixture is allowed to set after which the mold is removed, the shape is dried and then fired at about cone 18. For drying the green shapes, I prefer that they rest overnight in a 230° F. atmosphere.

It should be understood that the foregoing screen analysis is a preferred one but that variation may be had therefrom and usable batches still result. For example, ±5 percent of any of the various fractions given is acceptable. Even greater variation is acceptable in the coarser, +28 mesh screen fractions.

Shapes made according to the foregoing process and using my preferred mixture of ingredients (detailed below) poured easily and much better than the compositions disclosed in my above identified co-pending application. They also exhibited better mold release. They were more plastic in the green state, i.e. the pressure of a thumb did not break the surface of green shapes whereas such pressure had caused minute cracks with my previous mixes. When my preferred batch mixture was used to mold intricate shapes having internal cavities, no cracks or surface defects were noted on either the internal or external surfaces of the green shapes, nor on the surfaces of the fired shapes resulting therefrom.

The physical properties of laboratory shapes made of mixes of the type disclosed in my co-pending application, but in which 1 to 5 percent of my particular selected clay was substituted for other ingredients (usually for a portion of the volatilized silica), exhibited somewhat lower density and strength, and a higher subsidence under load at 3200° F. as compared to the compositions without the clay. However, all of their physical properties were considerably higher than previously found in high alumina refractory shapes. For example a mixture consisting of about 75 parts of tabular alumina, about 15 parts of calcined alumina, about 5 parts of potter's flint, about 2.5 parts of volatilized silica, and about 2.5 parts of my preferred selected clay were intimately admixed and tempered with about 6% of water and about 0.2 percent of a dispersant. The modulus of rupture of shapes made from this batch, fired to cone 18 (2670° F.), was 2350 lbs. per sq. in. The cold crushing strength was 15,600 p.s.i. The density was 176 p.c.f. These shapes had an apparent porosity of about 15.2 percent.

In the foregoing discussion I mentioned from 5.5 to 7.5 percent of tempering fluid for the batch. This is considered a critical range. A batch having about 5 percent of a tempering fluid does not flow and does not compact satisfactorily when subjected to vibration. In excess of 7.5 percent tempering fluid results in undesirably low density. Also, there is difficulty in removing the excess water from the green shapes.

I have started that from 1 to 5 percent of a selected clay is suitable for the practice of the invention. This also is to be considered a critical range. Less than about 1 percent has no effect. When the clay is present in excess of about 5 percent, the water requirement exceeds the critical range above given. For example, 6 percent of the clay raises the water requirement above 8 percent.

A usable clay for this invention has the following typical chemical analysis:

|  | Percent |
|---|---|
| $SiO_2$ | 61.5 |
| $Al_2O_3$ | 34.3 |
| $TiO_2$ | 1.9 |
| $Fe_2O_3$ | 1.1 |
| CaO | 0.2 |
| MgO | 0.3 |
| Alkalies | 0.5 |

Furthermore the clay is characterized by a major amount of laminar or plate-like sub-micron size particles. By a "major" amount I mean above 50 percent, preferably above 75 percent, by weight, of the crystalline particles of a representative sample of the material, when examined under the microscope, appear plate-like or laminar. The remainder of the particles of such a representative sample appear as stacks of flat or laminar crystalline particles.

The best clay for use according to this invention is one of the foregoing type, i.e. in which a major portion of the discrete particles thereof, when examined under a microscope, appear as plate-like particles and which has been subjected to a centrifugal separation treatment to remove most of the heavier "stacked" type particles.

Cast shapes shrink upon drying. It appears that my preferred type of clay allows slippage and stretch in the matrix forming material of drying shapes to a degree sufficient to prevent cracking upon shrinkage.

Fired shapes made according to the foregoing teachings are microscopically characterized by coarse textured high alumina refractory particles rigidly held in a dense matrix of sub-micron size mullite crystals. The matrix is further characterized by the presence of some of the plate-like particles of clay addition. The matrix is still further characterized by very few and highly dispersed voids.

The best composition according to this invention and that with which optimum physical properties will be obtained is one having the typical screen analysis set forth above and consisting essentially of about 90 parts of high purity tabular and calcined alumina, about 5 parts of crystalline silica (potter's flint), about 2.5 parts of volatilized silica, and about 2.5 parts of my selected particular clay. As was true of compositions disclosed in my co-pending application the crystalline silica addition is used to adjust the total $Al_2O_3$ content of the mixture to a more economical range. Thus, the amount of crystalline silica to be added is variable. However, I do not recommend the addition of more than about 10 percent of crystalline silica to a batch to be used for forming shapes according to this invention.

In the foregoing discussion all parts and percentages are by weight, and all chemical analyses are given on the basis of an oxide analysis in conformity with the common practice of reporting the chemical analysis of refractory materials. All screen sizes are according to the Tyler series.

Having thus described my invention in detail and with sufficient particularly as to enable those skilled in the art to practice it what I desire to have protected by Letters Patent is set forth in the following claims.

I claim:
1. A fired high alumina refractory body prepared from a readily castable size graded high alumina refractory batch consisting essentially of, by weight, from at least 1 to not over 10% of substantially pure volatilized silica, from at least 1 to not over 5% of a selected clay, said clay characterized by a major amount of sub-micron size plate-like particles, the remainder of the batch being coarse ground alumina refractory material, having less than about 1.3% by weight, of iron oxide and selected from the group consisting of alumina, aluminum ores and mixtures thereof, containing at least about 50% of $Al_2O_3$, by analysis, and sufficient crystalline silica to control the $Al_2O_3$ analysis of the total mix between about 50 and 98%, said fired shape microscopically characterized by coarse textured high alumina refractory particles rigidly held in a dense matrix of submicron-size mullite crystals, said matrix characterized by the presence of some plate-like clay particles and by very small and highly dispersed voids.

2. A fired high alumina refractory body prepared from a mix consisting essentially of, by weight, about 90 parts of high purity tabular and calcined alumina, about 5 parts of crystalline silica, about 2.5 parts of volatilized silica, and about 2.5 parts of a selected particular clay, said clay characterized, by a major weight amount of plate-like sub-micron size particles, said fired shape microscopically characterized by coarse textured high alumina refractory particles rigidly held at a dense matrix of sub-micron size mullite crystals, said matrix characterized by the presence of some plate-like clay particles and by very small and highly dispersed voids.

3. A castable high alumina refractory batch consisting essentially of, by weight, from at least 1 to not over 10% of substantially pure volatilized silica, from at least 1 to not over 5% of a selected clay, said clay characterized by a major amount of sub-micron size plate-like particles, the remainder of the batch being coarse ground alumina refractory material, having less than about 1.3%, by weight, of iron oxide and selected from the group consisting of alumina, aluminum ores and mixtures thereof, containing at least about 50% of $Al_2O_3$, by analysis, and sufficient crystalline silica to control the $Al_2O_3$ analysis of the total mix between about 50 and 98%, about 5.5 to 7.5%, based on the total weight of the dry batch, of tempering fluid, and from about 0.1 to 0.3% of a dispersant, also based on the total weight of the dry batch.

4. A castable high alumina refractory batch consisting essentially of a size graded mixture comprised of, by weight, from at least 1 to not over 10% of substantially pure volatilized silica, from at least 1 to not over 5% of a selected clay, said clay characterized by a major weight amount of plate-like particles, the remainder of the mixture being coarse ground alumina refractory material, having less than about 1.3%, by weight, of iron oxide and selected from the group consisting of alumina, aluminum ores and mixtures thereof, containing at least about 50% of $Al_2O_3$, by analysis, and sufficient crystalline silica to control the $Al_2O_3$ analysis of the total mix between about 50 and 98%, about 5.5 to 7.5%, based on the total weight of the dry batch, of tempering fluid, and from 0.1 to 0.3% of a dispersant also based on the total weight of the dry batch.

5. The batch of claim 4 in which at least about 40% of the dry mixture passes a 65 mesh screen and in which a major portion of the —65 fraction passes a 325 mesh screen.

6. The batch of claim 4 in which about 30% of the dry ingredients pass a 4 mesh and rest on a 10 mesh screen, about 20% pass a 10 mesh and rest on a 28 mesh screen, about 10% pass a 28 mesh and rest on a 65 mesh screen and the rest pass a 65 mesh screen.

7. A dry, unconsolidated high alumina refractory mixture for mixing with tempering fluid to make a size graded, high alumina refractory batch, said mixture consisting essentially of, by weight, from at least 1 to not over 10% of substantially pure volatilized silica, from at least 1 to not over 5% of a selected clay, said clay characterized by a major weight amount of sub-micron size plate-like particles, the remainder of the mixture being high alumina refractory material, having less than about 1.3%, by weight, of iron oxide and selected from the group consisting of alumina, aluminum ores and mixtures thereof, containing ta least about 50% of $Al_2O_3$, by analysis, and sufficient crystalline silica to control the $Al_2O_3$, analysis of the total mix between about 50 and 98%.

8. That method of making a high alumina refractory shape comprising the steps of, preparing a castable high alumina refractory batch consisting essentially of, by weight, from at least 1 to not over 10% of substantially pure volatilized silica, from at least 1 to not over 5% of a selected clay, said clay characterized by a major weight amount of sub-micron size plate-like particles, the remainder of the batch being high alumina refractory material, having less than about 1.3%, by weight, of iron oxide and selected from the group consisting of alumina, aluminum ores and mixtures thereof, containing at least about 50% of $Al_2O_3$, by analysis, and sufficient crystalline silica to control the $Al_2O_3$ analysis of the total mix between about 50 and 98%, about 5.5 to 7.5% based on the total weight of the dry batch, of tempering fluid, and from 0.1 to 0.3% of a dispersant also based on the total weight of the dry batch, flowing the wet batch into a moisture absorbent mold, allowing the material in the mold to set to form a cast shape, removing the cast shape, and drying the cast shape.

9. The method of making a high alumina refractory shape comprising the steps of, preparing a castable high alumina refractory batch consisting essentially of, weight, from at least 1 to not over 10% of substantially pure volatilized silica, from at least 1 to not over 5% of a selected clay, said clay characterized by a major weight amount of sub-micron size plate-like particles, the remainder of the batch being high alumina refractory material, having less than about 1.3%, by weight, of iron oxide and selected from the group consisting of alumina, aluminum ores and mixtures thereof, containing at least about 50% of $Al_2O_3$ by analysis, and sufficient crystalline silica to control the $Al_2O_3$ analysis of the total mix between about 50 and 98%, about 5.5 to 7.5% based on the total weight of the dry batch, of tempering fluid, and from 0.1 to 0.3% of a dispersant also based on the total weight of the dry batch, flowing the wet batch into a moisture absorbent mold, subjecting the mold to vibration, allowing the material in the mold to set to form a cast shape, removing the cast shape from the mold, and drying the cast shape.

10. That method of making a high alumina refractory shape comprising the steps of, preparing a castable high alumina refractory batch consisting essentially of, by weight, from at least 1 to not over 10% of substantially pure volatilized silica, from at least 1 to not over 5% of a selected clay, said clay characterized by a major weight amount of sub-micron size plate-like particles, the remainder of the batch being high alumina refractory material, having less than about 1.3%, by weight, of iron oxide and selected from the group consisting of alumina, aluminum ores and mixtures thereof, containing at least about 50% of $Al_2O_3$, by analysis, and sufficient crystalline silica to control the $Al_2O_3$ analysis of the total mix between about 50 and 98%, about 5.5 to 7.5% based on the total weight of the dry batch, of tempering fluid, and from 0.1 to 0.3% of a dispersant also based on the total weight of the dry batch, flowing the wet batch into a moisture absorbent mold, allowing the material in the mold to set to form a cast shape, removing the cast shape, drying the cast shape, and firing the dried shape.

11. That method of making a high alumina refractory shape comprising the steps of, preparing a castable high alumina refractory batch consisting essentially of, by weight, from at least 1 to not over 10% of substantially pure volatilized silica, from at least 1 to not over 5% of a selected clay, said clay characterized by a major weight amount of sub-micron size plate-like particles, the remainder of the batch being high alumina refractory material, having less than about 1.3%, by weight, of iron oxide and selected from the group consisting of alumina, aluminum ores and mixtures thereof, containing at least about 50% of $Al_2O_3$ by analysis, and sufficient crystalline silica to control the $Al_2O_3$ analysis of the total mix between about 50 and 98%, about 5.5 to 7.5% based on the total weight of the dry batch, of tempering fluid, and from 0.1 to 0.3% of a dispersant also based on the total weight of the dry batch, flowing the wet batch into a moisture absorbent mold, subjecting the mold to vibration, allowing the material in the mold to set to form a cast shape, removing the cast shape from the mold, drying the cast shape, and firing the dried shape.

References Cited in the file of this patent

UNITED STATES PATENTS

| | | |
|---|---|---|
| 2,339,454 | Bradley | Jan. 18, 1944 |
| 2,428,178 | Reik et al. | Sept. 30, 1947 |
| 2,672,671 | Robinson | Mar. 23, 1954 |
| 2,695,849 | McMullen | Nov. 30, 1954 |
| 2,899,323 | Venable | Aug. 11, 1959 |